US006757633B2

(12) United States Patent
Tseng

(10) Patent No.: US 6,757,633 B2
(45) Date of Patent: Jun. 29, 2004

(54) METHOD FOR MANUFACTURING IDENTIFICATION CODES OF INTEGRATED CIRCUITS

(75) Inventor: Chien-Tsai Tseng, Hsinchu Hsien (TW)

(73) Assignee: Winbond Electronics Corporation, Hsinchu (CN)

(*) Notice: Subject to any disclaimer, the term of this patent is extended or adjusted under 35 U.S.C. 154(b) by 57 days.

(21) Appl. No.: 10/186,868

(22) Filed: Jul. 1, 2002

(65) Prior Publication Data

US 2004/0002830 A1 Jan. 1, 2004

(51) Int. Cl.$^{7}$ .................................................. G06F 9/06

(52) U.S. Cl. ....................... 702/118; 702/119; 702/120; 702/121 G

(58) Field of Search ........................... 702/117–121, 46, 702/78, 116, 118, 177, 178; 327/165; 341/51; 377/45; 716/5, 15; 707/3, 10; 438/141, 142

(56) References Cited

U.S. PATENT DOCUMENTS 6,263,313 B1 * 7/2001 Milsted et al. ................. 705/1
6,385,609 B1 * 5/2002 Barshefsky et al. ........... 707/6
6,609,128 B1 * 8/2003 Underwood ................. 707/10
6,634,008 B1 * 10/2003 Dole ............................. 716/1
2003/0009715 A1 * 1/2003 Ricchetti et al. ............ 714/727

* cited by examiner

*Primary Examiner*—Marc S. Hoff
*Assistant Examiner*—Felix Suarez
(74) *Attorney, Agent, or Firm*—Ladas & Parry

(57) ABSTRACT

The present invention reveals a method for manufacturing identification codes of integrated circuit. A number of the test machine, a serial number and a period of time ahead of loading a test pattern are written into an integrated circuit in the process of testing as the identification code. Thus, the identification codes of each integrated circuit of normal lot, re-testing lot and quality control lot is distinct to avoid the problems caused by repetitive identification codes.

9 Claims, 3 Drawing Sheets

21 The number of test machine
22 A period of time ahead of loading a test pattern
23 Serial numbers
24
25
26

```
start:                      |     address      ||  data  |
"11111111111111111XX000000000000000000000000000000XXX10000000000000001XXXXXXXX0XXXXX1";  /* count_1  */
"11111111111111111XX000000000000000100000000000000XXX10000000000000001XXXXXXXX0XXXXX1";  /* count_2  */
"11111111111111111XX000000000000000100000000000000XXX10000000000000001XXXXXXXX0XXXXX1";  /* count_3  */
"11111111111111111XX000000000000000110000000000000XXX10000000000000001XXXXXXXX0XXXXX1";  /* count_4  */
"11111111111111111XX000000000000000000000000000000XXX10000000000000001XXXXXXXX0XXXXX1";  /* count_5  */
"11111111111111111XX000000000000000100000000000000XXX10000000000000001XXXXXXXX0XXXXX1";  /* count_6  */
"11111111111111111XX000000000000000100000000000000XXX10000000000000001XXXXXXXX0XXXXX1";  /* count_7  */
"11111111111111111XX000000000000000110000000010000XXX10000000000000001XXXXXXXX0XXXXX1";  /* count_8  */
"11111111111111111XX000000000000000000000000000000XXX10000000000000001XXXXXXXX0XXXXX1";  /* count_9  */
"11111111111111111XX000000000000000100000000000000XXX10000000000000001XXXXXXXX0XXXXX1";  /* count_10 */
"11111111111111111XX000000000000000100000000000000XXX10000000000000001XXXXXXXX0XXXXX1";  /* count_11 */
"11111111111111111XX000000000000000110000000100000XXX10000000000000001XXXXXXXX0XXXXX1";  /* count_12 */
"11111111111111111XX000000000000000000000000000000XXX10000000000000001XXXXXXXX0XXXXX1";  /* count_13 */
"11111111111111111XX000000000000000100000000000000XXX10000000000000001XXXXXXXX0XXXXX1";  /* count_14 */
"11111111111111111XX000000000000000100000000000000XXX10000000000000001XXXXXXXX0XXXXX1";  /* count_15 */
"11111111111111111XX000000000000000110000000110000XXX10000000000000001XXXXXXXX0XXXXX1";  /* count_16 */
.
.
.
stop:
"XXXXXXXXXXXXXXXXXXXXXXXXXXXXXXXXXXXXXXXXXXXXXXXXXXXXXXXXXXXXXXXXXXXXXXXXXXXXXXXXXXX";
```

METHOD FOR MANUFACTURING IDENTIFICATION CODES OF INTEGRATED CIRCUITS

BACKGROUND OF THE INVENTION

A. Field of the Invention

The present invention relates to a method for manufacturing identification codes of integrated circuits, and more specifically, to an automatic method for manufacturing identification codes of integrated circuits.

B. Description of Related Art

Almost all of the integrated circuits (ICs), such as those applied in a hard disk, a portable flash disk and a handset, etc., contain their own identification codes. If two hard disks or portable flash disks with the same identification code are simultaneously plugged into a personal computer, they will confuse the central processor unit (CPU) and cause a crash. Further, if the identification codes on the SIM cards of two handsets are the same, it will also result in communication problems.

Generally, writing an identification code into an IC is manually done with a module or a writer. This step alone takes more than 10 seconds for each IC, which is a waste of time and labor, and also may easily cause an inattentive error.

A normal wafer testing process is shown in FIG. 1. After testing for a whole lot of normal wafers, the passed wafers are sample-tested with the following quality control (QC) test and shipped out afterward, so as to prevent un-inspected defective products from the normal lot testing or improper locations of wafers deposited by people. The wafers that do not pass the testing will be re-tested, among which the passed ones will go through the same process before shipping, and the rest will be scrapped. The conventional manner of the use of serial numbers for writing ICs would not cause any problem for the employment of normal lot testing along, i.e., each IC has its own identification code (serial number). But, if wafers of a lot are conducted with a re-testing or a QC test, the serial number is reset to zero at the initialization of the lot testing, and the serial numbers written on the ICs are possibly repeated, causing the problems of repetitive identification codes.

SUMMARY OF THE INVENTION

The object of the present invention is to prevent each IC from having the same identification code and causing confusion during the IC operation and even resulting in a tool crash or system paralysis. Moreover, the present invention can be automated to avoid manual inattention and reduce labor cost.

The present invention uses a test machine to write the number of test machine, a period of time ahead of loading a test pattern and a serial number into each IC. The present invention can ensure that the written identification code of each IC is distinct to avoid the identification problems.

The manufacturing method of identification codes for ICs of a preferred embodiment according to the present invention includes the following steps: (a) a first pattern is produced, which comprises the data of the number of a test machine for testing ICs and a period of time ahead of loading a testing pattern into the test machine; (b) a second pattern is produced, which comprises the data of serial numbers and their corresponding addresses; (c) a serial number of the second pattern for one of the ICs is extracted based on the corresponding address; and (d) the number of the test machine, the period of time ahead of loading the testing pattern and the serial number are written into the IC specified by the corresponding address as the identification code.

The above-mentioned first pattern for being extracted by the test machine and written into the ICs can be formed in the way of extracting and converting the number of the test machine and the time by a program, such as a perl language. The second pattern can be one large enough for supplying all the serial numbers required by the ICs of a whole lot of wafers to save the time of repetitive pattern loading for each of the ICs. Before the testing of each lot of wafers or the testing of the same lot of wafers for the normal lots, re-testing lots and quality control lots, the serial numbers of them need to be reset to zero.

BRIEF DESCRIPTION OF THE DRAWINGS

FIG. 3 illustrates the serial number pattern in accordance with the present invention.

DETAILED DESCRIPTION OF THE INVENTION

Figure 1:
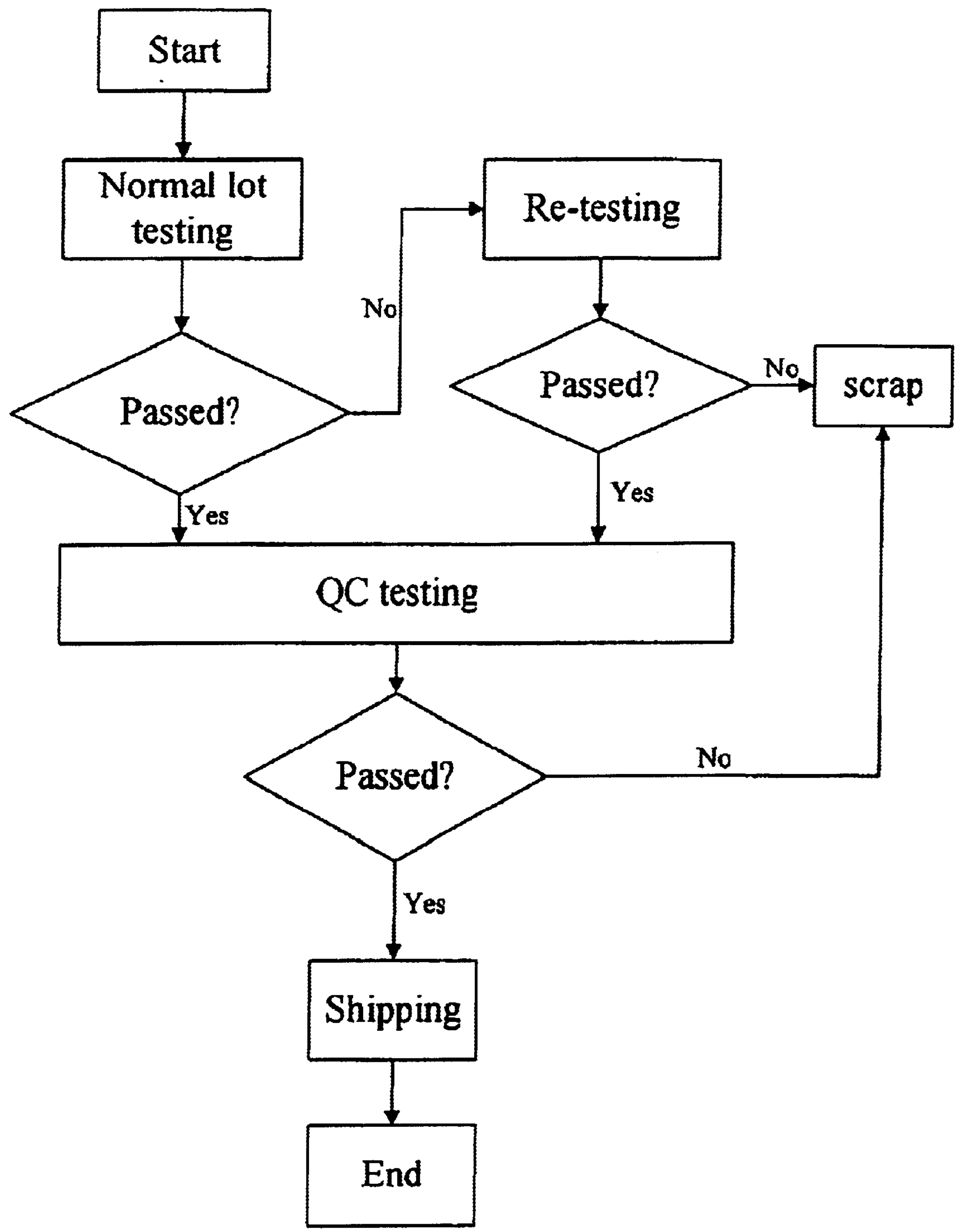
FIG. 1 illustrates a known wafer testing process.

If two test machines conduct IC testings simultaneously, the period of time ahead of loading a test pattern and the serial number of the IC for each test machine might be repeated, but the number of the test machine of that is definitely different. Referring back to FIG. 1, on a same test machine and in a same testing block (i.e. the normal lot testing, re-testing or QC testing), the written machine number and the period of time ahead of loading a test pattern of each IC are the same, but the serial number of that is different. And among different testing blocks, the number of the test machine and the serial number written into an IC might be the same, but the period of time ahead of loading a test pattern of that is definitely different. Thus, the present invention employs the writing the number of the test machine, the period of time ahead of loading a test pattern and the serial number as the identification code for an IC, so that it can effectively prevent repetition of the identification codes of ICs.

Figure 2:
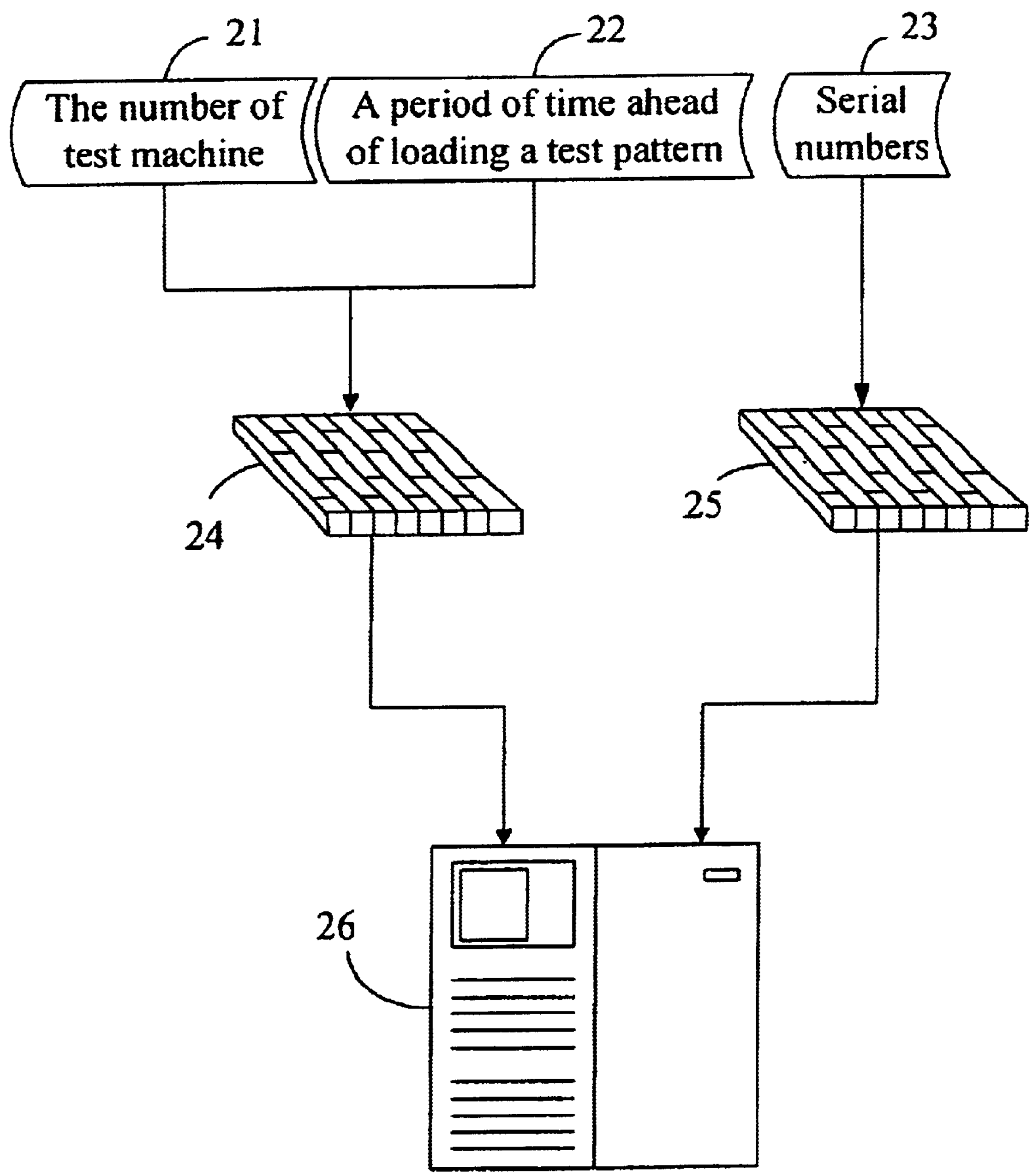
FIG. 2 illustrates the method for manufacturing identification codes of integrated circuits in accordance with the present invention.

Referring to FIG. 2, the embodiment employs the perl language to convert the number of the test machine 21 and a period of time ahead of loading a test pattern 22 into a first pattern 24 containing the number of the test machine 21 and the period of time ahead of loading the test pattern 22. Furthermore, a second pattern 25 containing serial numbers 23 is produced. Then, the first pattern 24 can be loaded into a test machine 26 together with the second pattern 25 and the test pattern (not shown), providing the test machine 26 to extract the data of the number of the test machine 21, the time 22 and the serial numbers 23 and to be written into the ICs as the identification codes and for IC testing. The error between the time ahead of loading the test pattern 22 and the real loading time of the first pattern 24 converted from that is less than 0.5 second, which can almost be neglected. The format of the period of time ahead of loading a test pattern 22 may use the difference between the time ahead of loading the test pattern (i.e. the absolute time) and a time reference, for example at 00:00, Jan. 1, 2001, such that the number of minutes passed is used as the time data for the following produced patterns. Therefore, the number of bits required for storing the time data in the pattern is smaller, which can effectively save the resource.

Referring to FIG. 3, the writing method of the serial numbers 23 can use a large serial number pattern 31 as the second pattern 25 for the use of ICs in a whole lot of wafers in order to prevent re-loading patterns during writing each IC and waste of time. The embodiment stores serial numbers in the data field with each row in 8-bit capacity. The serial numbers for count_1 to count_4 (differentiated by the data in the address field) are zero, and the serial numbers for count_5 to count_8 are 1, and the serial numbers for count_9 to count_12 are 2, and so on. A main program is used to control the extraction for the serial numbers based on the address. For example, the serial numbers for count_1 to count_4 are written into the first IC, the serial numbers for count_5 to count_8 are written into the second IC, the serial numbers for count_9 to count_12 are written into the third IC, and so on. In addition to saving the loading time, the large serial number pattern 31 of the present invention can effectively control the required written block by using a main program to control the variables of a start address and a stop address of the counts of the block. For example, the number of required serial numbers of a lot of 25 wafers, each wafer comprises more than 300 dies, is approximately 7,500 to 10,000. The large serial number pattern 31 in this example can provide a capacity of four 8-bit for the counts to each IC (32 bits in total), which is obviously sufficient for the requirement of the whole lot of wafers and also quite enough to be applied in a larger, 12-inch wafer.

Moreover, in the practical application, some test machines of the same brand are connected with each other and use the same first pattern 24. These test machines are set to re-extract the first pattern 24 in the operation. Thus, if one of the test machines is under testing, another test machine connected therewith conducts the testing afterward so as to change the first pattern 24. The first test machine may use the first pattern 24 produced from the second test machine, so that it will result in the same identification codes being written into the ICs, respectively. To solve the problem, it may provide the first pattern 24 with a machine number related name whenever the first pattern 24 is generated. For example, the first pattern 24 generated by the No.1 test machine is named "test1-pattern" and the first pattern 24 generated by the No.2 test machine is named "test2-pattern." Then a program is employed to control the selection of "test1-pattern" for the testing of the No.1 test machine and "test2-pattern" for the testing of the No.2 test machine to prevent generating the repetitive identification codes caused by extracting the machine number non-related to the test machine.

The present invention can use a main program for automatic operation to simultaneously control the making of the first pattern and the second pattern of the normal lots, re-testing lots and QC lots and write the data of an identification code into each IC, respectively, reducing the labor cost and manual defects.

The above-described embodiments of the present invention are intended to be illustrative only. Numerous alternative embodiments may be devised by those skilled in the art without departing from the scope of the following claims.

What is claimed is:

1. In a method for manufacturing identification codes of integrated circuits, the improvements comprising the following steps of:

making a first pattern which includes the number of a test machine for testing the integrated circuits and a period of time ahead of loading a test pattern into the test machine, wherein the test pattern is used to test functions of the integrated circuits;

making a second pattern which includes serial numbers of the integrated circuits and stored addresses of the serial numbers;

extracting the first pattern by the test machine;

extracting a serial number of the second pattern by the test machine; and writing the extracted first pattern and the serial number of the integrated circuits into one of the integrated circuits as the identification code by the test machine.

2. The method for manufacturing identification codes of integrated circuits of claim 1, wherein the first pattern is made by a perl language.

3. The method for manufacturing identification codes of integrated circuits of claim 1, wherein the test machine selects the serial numbers contained in a block confined by a start address and a stop address to write into the integrated circuits.

4. The method for manufacturing identification codes of integrated circuits of claim 1, wherein the extraction and the writing of the first pattern and the second pattern are controlled by a program.

5. The method for manufacturing identification codes of integrated circuits of claim 1, wherein the number of the serial numbers is larger than the number of the integrated circuits of a whole lot of wafers.

6. The method for manufacturing identification codes of integrated circuits of claim 1, wherein the serial number is reset to zero before a new lot of wafers is tested.

7. The method for manufacturing identification codes of integrated circuits of claim 1, wherein the period of time stored in the first pattern is a difference between a time of loading the test pattern and a predetermined reference time.

8. The method for manufacturing identification codes of integrated circuits of claim 1, applied for simultaneously testing the integrated circuits of wafers of normal lots, re-testing lots and quality control lots.

9. A method for manufacturing identification codes of integrated circuits, comprising the following steps of:

making at least one first pattern which includes the number of a test machine for testing the integrated circuits and a period of time ahead of loading a test pattern into the test machine, the name of each first pattern being related to the number of the test machine, wherein the test pattern is used to test functions of the integrated circuits;

making a second pattern which includes serial numbers and the stored addresses of the serial numbers;

extracting a serial number of the second pattern by the test machine;

extracting the first pattern having related name by the test machine; and writing the extracted first pattern and the serial number of the integrated circuits into one of the integrated circuits as the identification code by the test machine.

* * * * *